(12) United States Patent
Kia et al.

(10) Patent No.: US 9,284,981 B2
(45) Date of Patent: Mar. 15, 2016

(54) EXPANSION REDUCTION OF METAL COMPONENT ASSEMBLIES USING COMPOSITES

(71) Applicant: GM Global Technology Operations LLC, Detroit, MI (US)

(72) Inventors: Hamid G. Kia, Bloomfield Hills, MI (US); William E. Treib, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 40 days.

(21) Appl. No.: 14/278,050

(22) Filed: May 15, 2014

(65) Prior Publication Data

US 2015/0330446 A1 Nov. 19, 2015

(51) Int. Cl.
*F16C 33/30* (2006.01)
*B32B 37/14* (2006.01)
(Continued)

(52) U.S. Cl.
CPC . *F16C 33/30* (2013.01); *B32B 3/10* (2013.01); *B32B 3/263* (2013.01); *B32B 15/08* (2013.01); *B32B 15/18* (2013.01); *B32B 15/20* (2013.01); *B32B 18/00* (2013.01); *B32B 27/06* (2013.01); *B32B 27/20* (2013.01); *B32B 37/144* (2013.01); *B32B 38/00* (2013.01); *F16C 35/042* (2013.01); *F16C 43/04* (2013.01); *B32B 2038/0076* (2013.01); *B32B 2250/03* (2013.01); *B32B 2262/101* (2013.01); *B32B 2262/106* (2013.01); *B32B 2305/076* (2013.01); *B32B 2305/08* (2013.01); *B32B 2311/00* (2013.01);

(Continued)

(58) Field of Classification Search
CPC ............... Y10T 29/49638; Y10T 29/49828; Y10T 29/49938; Y10T 29/49645; Y10T 29/49694; Y10T 29/497; F16C 35/042; B32B 2305/05; B32B 37/144; B32B 15/20; B32B 15/08; B32B 15/18
See application file for complete search history.

(56) References Cited

U.S. PATENT DOCUMENTS 4,218,273 A * 8/1980 Feist .................... B29C 63/0021
156/242
4,888,247 A * 12/1989 Zweben .................. B32B 15/08
257/E23.107

(Continued)

OTHER PUBLICATIONS

The Engineering ToolBox, "Coefficients of Linear Thermal Expansion: Linear temperature expansion coefficients for some common materials as aluminum, copper, glass, iron and many more," available at http://www.engineeringtoolbox.com/linear-expansion-coefficients-d_95.html (downloaded on May 15, 2014) (5 pages).

*Primary Examiner* — Jason L Vaughan
(74) *Attorney, Agent, or Firm* — Harness, Dickey & Pierce, P.L.C.

(57) ABSTRACT

Methods for minimizing thermal expansion in an assembly, e.g., a bearing assembly, for a vehicle are provided. The assembly has at least two components with substantially different linear coefficients of thermal expansion (CLTEs). The assembly has a polymeric composite with a first CLTE, a lightweight metal component (e.g., a housing) with a second CLTE, and a third component (e.g., a bearing component) having a third CLTE. The second CLTE is ≥25% more than the third CLTE. The first CLTE is less than or equal to the third CLTE, so that the polymeric composite structure coupled to the first surface reduces radial thermal expansion of the first metal component and minimizes separation of the second surface of the first metal component from the second component.

13 Claims, 2 Drawing Sheets

(51) Int. Cl.
*B32B 38/00* (2006.01)
*F16C 35/04* (2006.01)
*B32B 3/10* (2006.01)
*B32B 18/00* (2006.01)
*B32B 15/08* (2006.01)
*B32B 27/06* (2006.01)
*B32B 3/26* (2006.01)
*B32B 15/20* (2006.01)
*B32B 15/18* (2006.01)
*B32B 27/20* (2006.01)
*F16C 43/04* (2006.01)

(52) U.S. Cl.
CPC ......... *B32B2311/24* (2013.01); *B32B 2311/30* (2013.01); *B32B 2313/04* (2013.01); *B32B 2315/02* (2013.01); *B32B 2315/085* (2013.01); *B32B 2398/20* (2013.01); *Y10T 29/49638* (2015.01); *Y10T 29/49645* (2015.01); *Y10T 29/49828* (2015.01); *Y10T 29/49938* (2015.01); *Y10T 156/10* (2015.01); *Y10T 428/24612* (2015.01); *Y10T 428/24802* (2015.01); *Y10T 428/269* (2015.01); *Y10T 428/31678* (2015.04)

(56) References Cited

U.S. PATENT DOCUMENTS

| | | | | |
|---|---|---|---|---|
| 4,892,421 A | * | 1/1990 | Hofgren | F16C 27/066 384/492 |
| 5,485,905 A | * | 1/1996 | Rader, III | B62M 11/00 192/41 A |
| 5,780,157 A | * | 7/1998 | Tuffias | C23C 16/01 244/133 |
| 5,976,670 A | * | 11/1999 | Fugazzi | A47B 13/08 428/161 |
| 6,086,162 A | | 7/2000 | Pinch et al. | |
| 6,698,184 B1 | * | 3/2004 | Sowa | B64G 1/401 60/206 |
| 6,755,212 B1 | * | 6/2004 | Anderson | B66C 23/64 137/615 |
| 6,865,809 B2 | | 3/2005 | Vorbeck | |
| 7,494,715 B2 | * | 2/2009 | Kagehisa | B32B 3/10 428/134 |
| 7,891,684 B1 | | 2/2011 | Luttinen et al. | |
| 8,160,774 B2 | | 4/2012 | Li et al. | |
| 8,863,924 B2 | * | 10/2014 | Ehinger | F16D 1/0858 192/107 T |
| 9,068,621 B1 | * | 6/2015 | Halladay | F16F 1/3605 |
| 2010/0276047 A1 | | 11/2010 | Kleber et al. | |
| 2011/0062770 A1 | | 3/2011 | Krajewski et al. | |
| 2011/0084547 A1 | | 4/2011 | Ehrlich et al. | |
| 2012/0086264 A1 | | 4/2012 | Carlson et al. | |
| 2012/0088116 A1 | | 4/2012 | Carlson et al. | |
| 2013/0026816 A1 | | 1/2013 | Kia et al. | |
| 2014/0048988 A1 | | 2/2014 | Soles et al. | |
| 2014/0097605 A1 | | 4/2014 | Campos et al. | |
| 2015/0165833 A1 | | 6/2015 | Rodgers et al. | |

\* cited by examiner

EXPANSION REDUCTION OF METAL COMPONENT ASSEMBLIES USING COMPOSITES

FIELD

The present disclosure relates to minimizing differential thermal expansion of lightweight metal components by using strategic incorporation of polymeric composites, for example, by incorporating polymeric composites into automotive bearing assemblies having lightweight metal components.

BACKGROUND

This section provides background information related to the present disclosure which is not necessarily prior art.

Weight reduction for fuel economy in vehicles has spurred the use of various lightweight metal components, such as aluminum and magnesium. While use of such lightweight metals serves to reduce overall weight and generally improves fuel efficiency, these metals also have relatively high linear coefficients of thermal expansion, as compared to traditional steel or ceramic materials. In component assemblies, the use of such lightweight metals can cause uneven thermal volumetric expansion under certain thermal operating conditions relative to adjacent components having lower linear coefficients of thermal expansion, like steel or ceramic materials.

For certain applications, especially in power train units and bearing assemblies, appropriate preloading and clearance within the bearing assembly maintains efficiency of performance, while uneven thermal expansion can cause spin loss and thus diminish performance and fuel efficiency. In the past, various components in bearing assemblies, including the housing and bearings themselves, were formed of similar materials like steel or ceramic, which share similar linear coefficients of thermal expansion. Thus, fluctuations in temperature during operation of the vehicle for conventional systems with materials having similar linear coefficients of thermal expansion did not result in significant volumetric changes affecting preloading or clearance in bearing assemblies or other component assemblies.

While the use of the lightweight metal components has the potential to reduce fuel economy gains attributable to weight reduction, the variability and inconsistency of bearing clearances due to the substantial differences in linear coefficients of thermal expansion can potentially result in significant spin loss and other decreased performance efficiency. Thus, a system and method for diminishing thermal expansion in automotive systems having components comprising both lightweight metals (having relatively high linear coefficients of thermal expansion) and traditional materials (having lower linear coefficient of thermal expansion) would be desirable to control such thermal expansion and further improve efficiency of operation and fuel economy.

SUMMARY

This section provides a general summary of the disclosure, and is not a comprehensive disclosure of its full scope or all of its features.

In certain aspects, the present disclosure provides methods of minimizing thermal expansion in a component assembly for a vehicle having at least two components with substantially different linear coefficients of thermal expansion. The method may comprise coupling a polymeric composite structure having a first coefficient of linear thermal expansion (CLTE) and a modulus of greater than or equal to about 40 GPa to a first surface of a first metal component having a second CLTE. The first metal component further defines a second surface opposite to the first surface. The second surface is disposed in proximity with a second component having a third CLTE. The second CLTE is greater than or equal to about 25% more than the third CLTE, while the first CLTE is less than or equal to the third CLTE. The polymeric composite structure coupled to the first surface reduces radial thermal expansion of the first metal component and minimizes separation of the second surface of the first metal component from the second component.

In other aspects, the present disclosure provides a component assembly for a vehicle having at least two components with substantially different linear coefficients of thermal expansion. The component assembly comprises a polymeric composite structure coupled to a first surface of a first metal component. The polymeric composite structure has a first coefficient of linear thermal expansion (CLTE) less than or equal to about $10 \times 10^{-6}/°$ C. and a modulus of greater than or equal to about 40 GPa. The first metal component defines the first surface and an opposite second surface. The first metal component has a second CLTE greater than or equal to about $20 \times 10^{-6}/°$ C. A second component is disposed in proximity to the opposite second surface and has a third CLTE less than or equal to about $20 \times 10^{-6}/°$ C. The polymeric composite structure coupled to the first surface reduces radial thermal expansion of the first metal component and minimizes separation of the second surface of the first metal component from the second component.

In certain aspects, the present disclosure provides methods of minimizing thermal expansion in a preloaded bearing assembly for a vehicle having at least two components with substantially different linear coefficients of thermal expansion. The method may comprise coupling a polymeric composite structure having a first coefficient of linear thermal expansion (CLTE) and a modulus of greater than or equal to about 40 GPa to a first surface of a housing formed of a lightweight metal having a second CLTE. The housing further defines a second surface opposite to the first surface. The second surface is disposed in proximity with a bearing component having a third CLTE. The bearing component is disposed under static preload against the second surface. The second CLTE is greater than or equal to about 25% more than the third CLTE. The first CLTE is less than or equal to the third CLTE. The polymeric composite structure coupled to the first surface reduces radial thermal expansion of the housing and minimizes separation of the second surface of the housing from the bearing component.

In certain other aspects, the present disclosure contemplates a preloaded bearing assembly for a vehicle having at least two components with substantially different linear coefficients of thermal expansion. The preloaded bearing assembly may comprise a polymeric composite structure coupled to a first surface of a housing formed of a lightweight metal. The polymeric composite structure has a first coefficient of linear thermal expansion (CLTE) and a modulus of greater than or equal to about 40 GPa. The housing has a second CLTE. A bearing component is disposed under static preload in proximity to a second surface of the housing opposite to the first surface. The bearing component has a third CLTE. The second CLTE is greater than or equal to about 25% more than the third CLTE. The first CLTE is less than or equal to the third CLTE. The polymeric composite structure coupled to the first surface reduces radial thermal expansion of the housing and minimizes separation of the second surface of the housing from the bearing component.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 3:
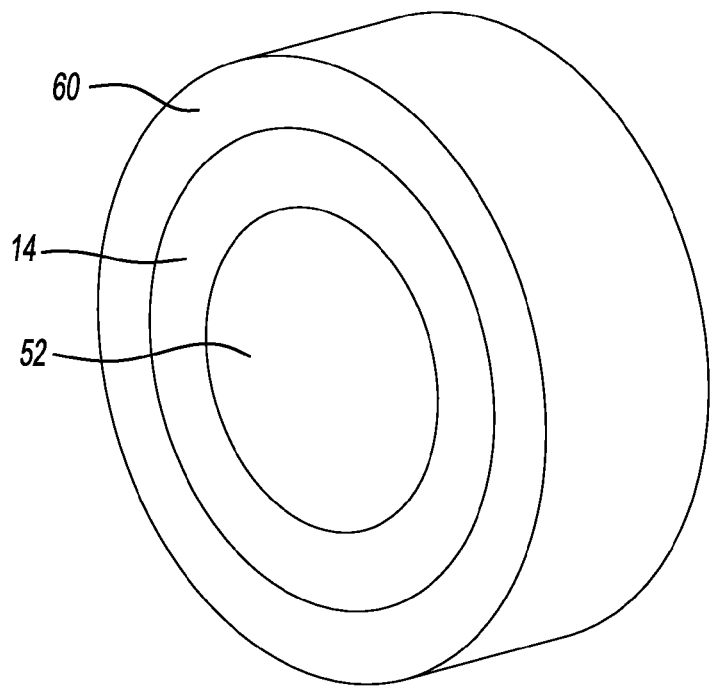
Figure 4:
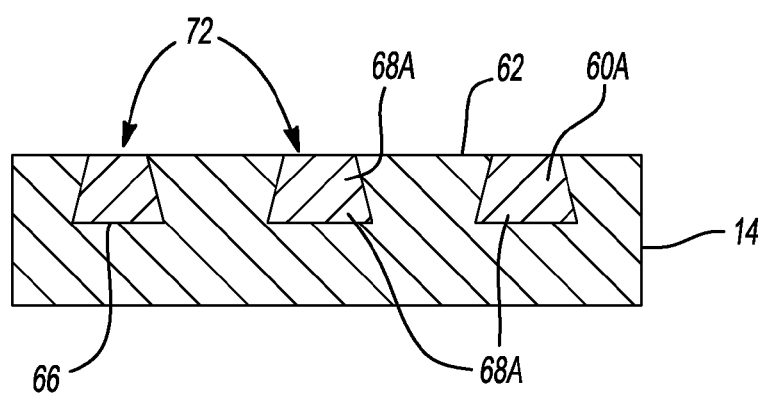

FIG. 3 shows a perspective view of a polymeric composite material component in the form of a ring for reducing thermal expansion of a lightweight metal according to certain aspects of the present disclosure; and FIG. 4 shows a detailed sectional view of an alternative variation of a polymeric composite material component for reducing thermal expansion of a lightweight metal in the bearing assembly according to certain other aspects of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

It should be understood that for any recitation of a method, composition, device, or system that "comprises" certain steps, ingredients, or features, that in certain alternative variations, it is also contemplated that such a method, composition, device, or system may also "consist essentially of" the enumerated steps, ingredients, or features, so that any other steps, ingredients, or features that would materially alter the basic and novel characteristics of the invention are excluded therefrom.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters.

In addition, disclosure of ranges includes disclosure of all values and further divided ranges within the entire range, including endpoints and sub-ranges given for the ranges.

In a vehicle, such as an automobile, an engine is a power source that produces torque for propulsion. A power transmission or power transfer unit (PTU) selectively transfers the rotating power (torque) to front and/or rear shafts or axles of the vehicle. The transmission or PTU is an assembly of parts, including speed-changing gears, shafts, and bearings that transfer power from an engine to a live axle. For example, in four-wheel drive or all-wheel drive vehicles, the transmission or PTU transfers torque to front and rear axles. Each axle receiving rotational torque transfers the torque to an associated wheel of the vehicle to propel the vehicle.

Figure 1:
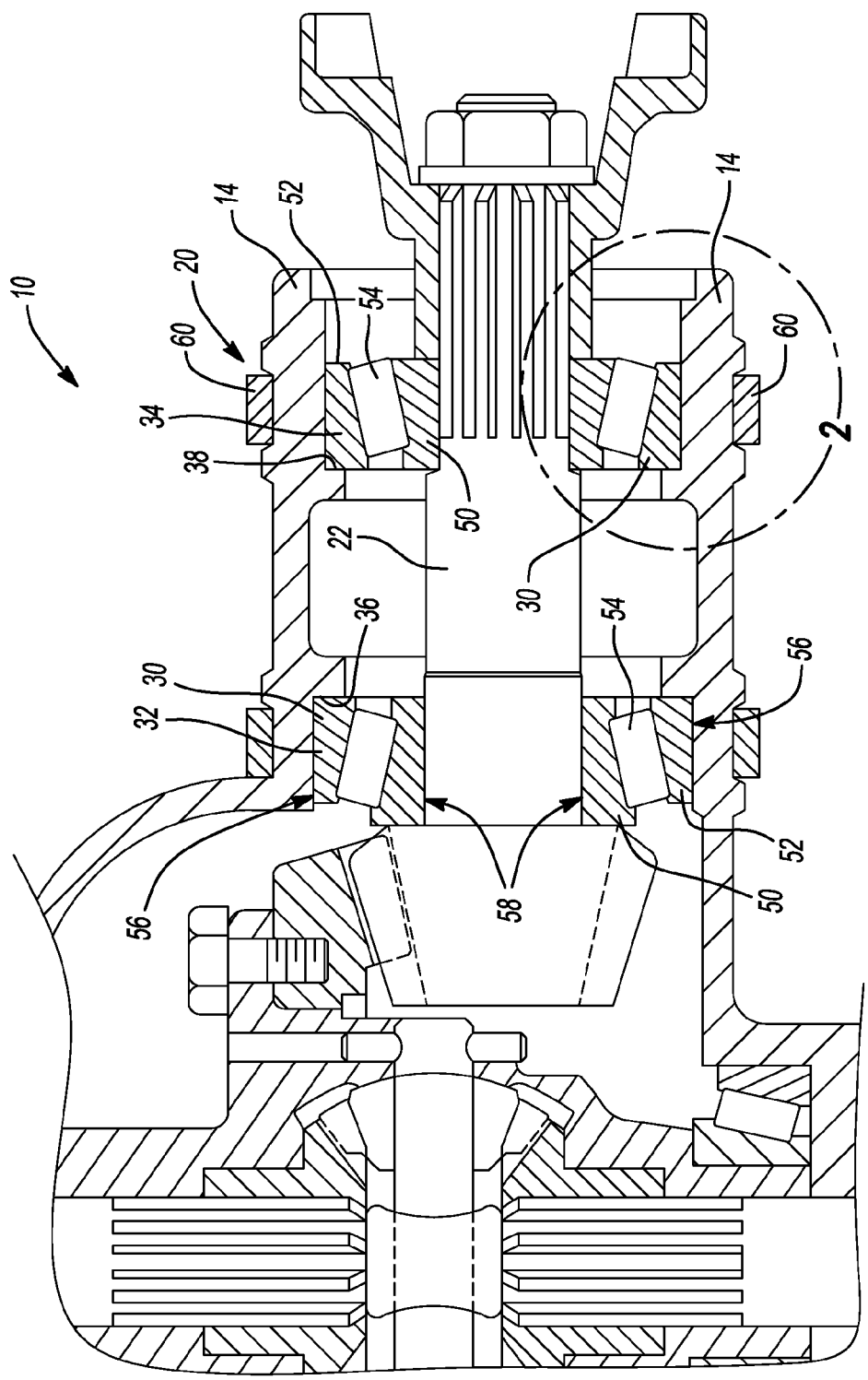
FIG. 1 shows a sectional view of an exemplary bearing assembly in an automotive rear transfer unit.

Referring to FIG. 1, a partial cross sectional view is shown illustrating an exemplary rear wheel drive transmission 10 to illustrate certain principles of the present disclosure. Thus, it should be appreciated that the present teachings are not limited to such a transmission 10, thus the type, configuration, and design shown in FIG. 1 is merely exemplary and non-limiting to illustrate certain principles of the present disclosure. The transmission 10 includes a first bearing assembly 20, which includes an assembly housing 14 and a rotatable shaft 22. A plurality of bearings 30 is positioned in engagement with the shaft 22. As shown, a first bearing 32 is paired opposite to a second bearing 34 in the first bearing assembly 20.

The first bearing 32 and the second bearing 34 are angled or tapered roller bearings that are disposed and supported within seating regions or pockets 36, 38 defined by the housing 14. Tapered roller bearings and angular contact ball bearings are frequently used to support rotatable shafts or gears in transmission assemblies. Rolling bearings usually retain some internal clearance while in operation, however, in certain applications, it is desirable to provide a negative clearance keeping them under internal stress or "preloaded." Static preload for bearing can enable proper functioning to maximize durability of components by minimizing axial and radial play, spin loss, and noise under various operating conditions. A preload is usually applied to bearings in which the radial clearance can be adjusted during mounting, such as angular contact ball bearings or tapered roller bearings. Usually, two bearings (e.g., are mounted face-to-face or back-to-back to form a duplex pair of bearings like first bearing 32 and second bearing 34) with a preload.

As shown, the first or second tapered roller bearings 32, 34 include an inner cone or inner ring 50, an outer cup or outer ring 52, and rolling bearing elements 54. Such bearing components (50, 52, or 54) may be formed of a steel alloy material or ceramic material. The outer ring 52 is adjacent to and/or in contact with the housing 14 so as to define a first interface region 56 therebetween. The inner ring 50 is adjacent to and/or in contact with shaft 22 to define a second interface region 58 therebetween. The shaft 22 may be formed of a conventional material, such as steel.

As discussed above, in certain aspects according to the present teachings, the housing 14 may be formed of a material that has a substantially different linear coefficient of thermal expansion (a) as compared to a comparative linear coefficient of thermal expansion (a) for the material forming the bearing 30 interfacing with the housing 14 at the first interface region 56. In certain preferred variations, the housing 14 may be formed of a lightweight metal, such as aluminum or magnesium. In certain aspects, the present teachings are useful where there is a substantial difference or mismatch in a linear coefficient of thermal expansion (a) (CLTE) between adjacent materials in an assembly, especially a bearing assembly for a vehicle. Such a "substantial mismatch" or difference in CLTE may be greater than or equal to about 10%, optionally greater than or equal to about 25%, optionally greater than or equal to about 50%, optionally greater than or equal to about 75%, optionally greater than or equal to about 100%, optionally greater than or equal to about 125%, optionally greater than or equal to about 150%, optionally greater than or equal to about 175%, and in certain variations is greater than or equal to about 200%. In such circumstances, a mismatch between adjacent materials in the bearing assembly can cause differences in radial expansion, which tends to be the dominant direction that affects bearing preloads. Notably, the principles of the present disclosure may also broadly apply to other systems where materials associated with one another have significant CLTE mismatch or differences or where dimensional tolerance and preloads are important, aside from only bearing assemblies.

By way of example, aluminum (Al) has a linear coefficient of thermal expansion (CLTE) of approximately $24 \times 10^{-6}/° C$. It is noted that any listed parameter or measured value described in the detailed description may vary by ±10%. In addition, as will be appreciated by those of skill in the art, such values are generally representative but not limiting, as alloys of various metals may contain differing alloying ingredients and therefore may differ somewhat from the pure metal or base alloy measurements. Magnesium (Mg) has a representative CLTE of approximately $26 \times 10^{-6}/° C$. By comparison, steel alloys used for these applications as bearing components typically have an average CLTE of approximately $12 \times 10^{-6}/° C$. to $13 \times 10^{-6}/° C$. Thus, where the housing 14 comprises aluminum or another lightweight metal and the corresponding outer ring 52 of the bearing 30 comprises a steel alloy, the difference in CLTE is at least about 85% increase from a comparative system where the housing 14 was made from a conventional steel (rather than from the new lightweight aluminum metal). Likewise, if the housing 14 comprises magnesium and the corresponding outer ring 52 of the bearing 30 comprises a steel alloy, the difference in CLTE is at least about a 100% increase from a comparative system where the housing 14 was made from conventional steel. As discussed above, such differences in CLTE can cause significant issues at higher operating temperatures, especially in bearing assemblies where the amount of preloading on the bearing may be diminished by uneven expansion rates of adjacent materials, potentially resulting in spin loss and less efficient performance.

In accordance with certain aspects of the present disclosure, methods are provided to counteract and diminish the amount of expansion of a higher CLTE material associated with a lower CLTE material (e.g., to assist with maintaining an amount of predetermined preload in a bearing system with CLTE mismatched materials through a range of typical operating temperatures).

Thus, the present disclosure contemplates methods of minimizing thermal expansion in component assemblies for vehicles having at least two components with substantially different linear coefficients of thermal expansion. In certain variations, such a method may comprise coupling a polymeric composite structure having a first coefficient of linear thermal expansion (CLTE) and a modulus of greater than or equal to about 40 GPa to a first surface of a first metal component having a second CLTE. In certain variations, the tensile modulus of the polymeric composite material is greater than or equal to about 50 GPa, optionally greater than or equal to about 60 GPa, optionally greater than or equal to about 64 GPa, optionally greater than or equal to about 70 GPa, optionally greater than or equal to about 75 GPa, optionally greater than or equal to about 100 GPa, optionally greater than or equal to about 150 GPa, optionally greater than or equal to about 200 GPa, and in certain variations, optionally greater than or equal to about 250 GPa. Such a relatively high tensile modulus for the polymeric composite structure provides the necessary rigidity and structure to restrain radial expansion of the first metal component. The first metal component further defines a second surface opposite to the first surface disposed in proximity with a second component having a third CLTE.

In certain aspects, the second CLTE of the first metal component is greater than or equal to about 25% more than the third CLTE of the second component, optionally greater than or equal to about 40%, optionally greater than or equal to about 100% or any of the values discussed above in the context of the substantially different CLTE (CLTE mismatch).

As noted above, the second CLTE differs from the third CLTE by any of the values previously listed above. In certain aspects, the second CLTE of the first metal component is greater than or equal to about 40% more than the third CLTE of the second component. In other aspects, the second CLTE may be greater than or equal to about 100% more than the third CLTE of the second component.

In certain variations, the polymeric composite structure may have a first coefficient of linear thermal expansion (CLTE) of less than or equal to about $10 \times 10^{-6}/°$ C. and a modulus of greater than or equal to about 40 GPa. In certain aspects, the first CLTE is optionally less than or equal to about $8 \times 10^{-6}/°$ C., optionally less than or equal to about $6 \times 10^{-6}/°$ C., optionally less than or equal to about $4 \times 10^{-6}/°$ C., and in certain variations, optionally less than or equal to about $2 \times 10^{-6}/°$ C. The first metal component defines the first surface and an opposite second surface. The first metal component has a second CLTE greater than or equal to about $20 \times 10^{-6}/°$ C., optionally greater than or equal to about $24 \times 10^{-6}/°$ C., and in certain variations, optionally greater than or equal to about $26 \times 10^{-6}/°$ C. The component assembly also comprises a second component disposed in proximity to the opposite second surface and having a third CLTE less than or equal to about $20 \times 10^{-6}/°$ C., optionally less than or equal to about $15 \times 10^{-6}/°$ C., optionally less than or equal to about $12 \times 10^{-6}/°$ C., optionally less than or equal to about $10 \times 10^{-6}/°$ C., optionally less than or equal to about $7 \times 10^{-6}/°$ C., optionally less than or equal to about $5 \times 10^{-6}/°$ C., and in certain variations, optionally less than or equal to about $4 \times 10^{-6}/°$ C. The polymeric composite structure coupled to the first surface reduces radial thermal expansion of the first metal component and minimizes separation of the second surface of the first metal component from the second component. In certain variations, the first CLTE of the polymeric composite material is preferably less than or equal to about $10 \times 10^{-6}/°$ C., the second CLTE of the first metal component is greater than or equal to about $20 \times 10^{-6}/°$ C., and the third CLTE of the second component is less than or equal to about $20 \times 10^{-6}/°$ C.

In accordance with certain aspects of the present teachings, Table 1 provides a non-limiting list of different CLTE and tensile modulus values for suitable materials that can be used in accordance with the principles of the present disclosure.

TABLE 1

| Component | Material | CLTE, $10^{-6}/°$ C. | Tensile modulus, GPa |
|---|---|---|---|
| First Metal Component (e.g., housing) | Aluminum | 24 | 75 |
| | Magnesium | 26 | 45 |
| Second Component (e.g., bearing) | Steel | 12 | 200 |
| | Ceramics (alumina) | 7 | 360 |
| | Ceramics(silicon carbide) | 4 | 440 |
| Polymeric Component | KEVLAR ™ Poly-paraphenylene terephthalamide | 4 | 75 |
| | KEVLAR ™ Poly-paraphenylene terephthalamide composites unidirectional (53 wt. % in epoxy) | 8 | 64 |
| | Carbon fiber thermoset reinforced composite (axial direction) | −0.3 | 250 |
| | Carbon fiber reinforced Unidirectional (e.g., 60 wt. % loading with epoxy thermoset matrix) | 2 | 150 |
| | Glass fiber reinforced composite (e.g., type E) | 6 | 40 |
| | Glass fiber reinforced composites unidirectional (e.g., 50 wt. % loading with epoxy thermoset matrix) | 10 | 40 |

Thus, in accordance with certain methods of the present disclosure, the polymeric composite structure is coupled to the first metal component serving to reduce radial thermal expansion of the first metal component and minimize separation of the second surface of the first metal component from the second component. This is particularly advantageous where the first metal component and the second component having thermal mismatch, yet are desirably maintained under preloaded stress through a wide range of operating temperatures to enhance performance.

In certain aspects, the step of coupling may comprise attaching the polymeric composite material to the first metal component via one or more mechanical interlock features. For example, as best shown in the detailed view in FIG. 2, a polymeric composite structure 60 is coupled to a first outer surface 62 of the housing 14. The housing 14 also has a second inner surface 64 opposite to the first outer surface 62. The second inner surface 64 is in proximity with a second component (here outer ring 52 of the bearing 30). It should be noted that while there may be a gap or clearance between the second inner surface 64 and the outer ring 52 surface, where the bearing assembly is under static preload, preferably contact will be established (ideally through all operating condition temperature ranges). The housing 14 comprises a plurality of first locking features 66 that define voids on the first outer surface 62. The polymeric composite structure 60 comprises a plurality of second locking features 68 that are complementary to the shape of the first locking features 66 and thus interlock and mechanically couple the polymeric composite structure 60 with the housing 14.

Figure 2:
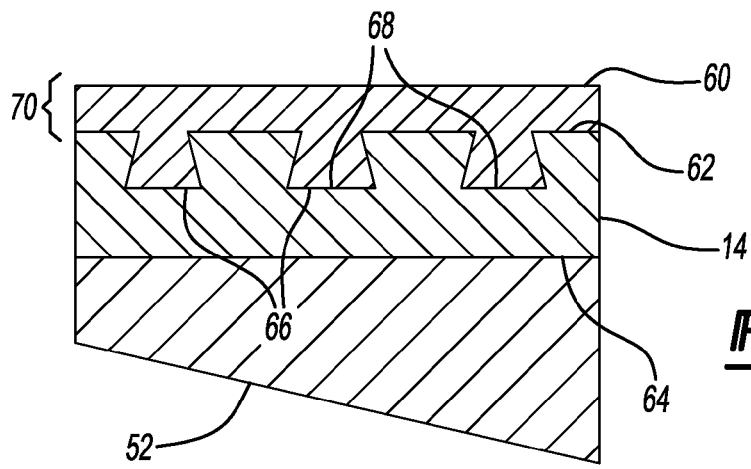
FIG. 2 shows a detailed view taken along line 2-2 in FIG. 1 showing a polymeric composite material component for reducing thermal expansion of a lightweight metal in the bearing assembly according to certain aspects of the present disclosure.

Thus, in various aspects, the outer surface 62 of the housing 14 defines at least one mechanical locking feature to interact with and retain the polymeric composite structure 60. As shown in FIG. 2, the first locking features 66 and complementary second locking features 68 cooperate to define a dovetail configuration; however, other mechanical interlock shapes and designs may be used for coupling the components together. For example, complementary protruding flanges, grooves, channels, locking wings of differing shapes could be used as mechanical locking features. Thus, in certain variations, the polymeric composite structure 60 is integrated into a dovetail groove on the first outer surface 62 of the housing 14 formed of a lightweight metal material, such that the composite and the lightweight metal will remain solidly integrated at all temperatures experienced in service. The polymeric composite structure 60 can thus form a collar, ring, or band that provides reinforcement and restrains expansion of the adjacent component (e.g., the housing 14) to which it is coupled.

Polymeric composite materials that form polymeric composite structure 60, like carbon-fiber reinforced polymers, have a low CLTE and a high tensile modulus as set forth above in Table 1. Lightweight metals, such as aluminum and magnesium, used to the form the housing 14 have a high CLTE and a relatively moderate tensile modulus. By coupling the polymeric composite structure 60, the material properties of the composite make it possible to cancel out the effects caused by lightweight metal housing 14 thermally expanding at a higher rate than the adjacent bearing component (e.g., steel bearing outer ring 52). As noted above, in the absence of the polymeric composite structure 60, the difference in thermal expansion between the lightweight metal and the adjacent steel or ceramic bearing causes the bearing preloads to change. Yet, by introducing the polymeric composite structure 60 to the first outer surface 62 of the housing 14 adjacent to the internal steel bearings (e.g., outer bearing ring 52), the polymeric composite structure 60 constrains thermal expansion in the radial direction (the dominant direction that affects bearing preloads).

The coupling step may include applying a pre-preg composite precursor to the first outer surface 62 of the housing 14, followed by curing the pre-preg composite material to form the polymeric composite structure. Polymeric composites can be formed by using strips of the composite precursor material, such as a fiber-based material (e.g., cloth or graphite tape). The composite may be formed with one or more layers, where each layer can be formed from contacting and/or overlapping strips of the fiber-based material. The fiber-based substrate material also comprises a resin. The resin can be cured after the fiber-based material is applied to the work surface (here first outer surface 62 of housing 14) and thus can serve to bond single or multiple layers together in the polymeric composite structure 60.

Two methods are typically employed for introducing resin to impregnated fiber-based substrate composite material systems: wet winding (or layup) or pre-impregnating (referred to as "pre-preg"). For wet winding, a dry fiber reinforcement material can be wetted with the resin as it is used, usually by submersion through a bath. For pre-impregnating (pre-preg), the resin is wetted into the fiber-based material in advance, and usually includes a step of partially curing the resin to have a viscous or tacky consistency (also known as a B-stage partial cure), and then winding up the pre-preg fiber-based material for later use. Pre-preg composite material systems tend to use thermoset resin systems, which can be cured by elevated temperatures with cure times ranging from about 30 minutes to about 2 hours (depending on the cure temperatures). However, some pre-preg materials may employ resins that cure with actinic radiation (e.g., ultraviolet radiation (UV)).

In certain other aspects, the present teachings also contemplate a coupling step where a reinforcement material is applied, for example, via filament winding near, within, and/or over the first locking features 66. The method may optionally comprise applying or introducing an uncured resin composition into or onto the fiber-based reinforcement material. By applying, it is meant that the uncured resin composition is wetted out onto the fiber-based material and thus may be coated on a surface of the fiber-based material or imbibed/impregnated into the reinforcement fiber-based material (for example, into the pores or openings within the reinforcement fiber-based material). After the resin is introduced to the regions having the reinforcement material, followed by curing to form the polymeric composite structure including the second locking features 68.

In other variations, a composite precursor material may be injection molded or otherwise applied to the first outer surface 62 and the first locking features 66, which may be followed by curing to form the polymeric composite structure 60.

As shown in FIG. 2, the polymeric composite structure 60 is applied within the first locking features 66 to define the second locking features 68; however, it also has a continuous upper body region 70 bridging from one respective second locking feature 68 to an adjacent locking feature. Thus, where the first outer surface 62 of the housing 14 is circumferential and the polymeric composite structure 60 is disposed around the first outer surface 62, the polymeric composite structure 60 may be considered to be a ring or band design as shown in FIG. 3.

In certain aspects, a thickness of the polymeric composite structure 60 corresponding to the upper body region 70 is less than or equal to about 10 mm, optionally less than or equal to about 9 mm, optionally less than or equal to about 8 mm, optionally less than or equal to about 7 mm, optionally less than or equal to about 6 mm, optionally less than or equal to about 5 mm, optionally less than or equal to about 4 mm, optionally less than or equal to about 3 mm, optionally less than or equal to about 2 mm, and in certain variations, optionally less than or equal to about 1 mm.

In certain alternative variations like that in FIG. 4, the polymeric composite structure 60A is disposed along discrete, discontinuous regions 72 of the first outer surface 62 corresponding to regions of the first locking features 66. Thus, the polymeric composite structure 60A defines the second locking features 68A that are complementary with the first locking features 66; however, the polymeric composite structure 60A does not extend across the first outer surface 62 like the embodiment shown in FIGS. 2 and 3.

As noted above, in certain variations, the first metal component (e.g., housing 14) is formed of a metal selected from the group consisting of: aluminum, magnesium, and alloys thereof, which can be readily machined or die cast. The methods of the present disclosure thus also contemplate forming a mechanical interlock feature like the plurality of first locking features 66 in FIGS. 2-4, by machining the outer surface (e.g., 62) to form the mechanical interlock feature. In such variations, the second component (e.g., bearing outer ring 52) comprises a material selected from the group consisting of: steel, and ceramic, while the polymeric composite structure (e.g., 60 or 60A) may comprise a thermoplastic resin and a plurality of reinforcing materials selected from the group consisting of: carbon, glass, and combinations thereof. In certain variations, the methods are particularly useful where the first metal component is a bearing assembly housing and the second component is a portion of a preloaded bearing component. By providing more consistent and even preload, this will result in a more consistent stiffness for the gears, which enables a more consistent gear pattern resulting in a finer meshing of the gears, which reduces backlash. Further, by providing more consistent and even preload, fuel economy can be improved due to lower drag loss in the bearings.

Likewise, smaller bearings can be used due to the reduced effective duty cycle. This provides the advantage of reducing mass and further reducing drag losses.

The present disclosure likewise contemplates an improved component assembly for a vehicle having at least two components with substantially different linear coefficients of thermal expansion. The component assembly may comprise a polymeric composite structure coupled to a first surface of a first metal component (e.g., a bearing housing). The polymeric composite structure may have a first coefficient of linear thermal expansion (CLTE) of less than or equal to about $10 \times 10^{-6}/°$ C. and a modulus of greater than or equal to about 40 GPa. In certain aspects, the first CLTE is optionally less than or equal to about $8 \times 10^{-6}/°$ C., optionally less than or equal to about $6 \times 10^{-6}/°$ C., optionally less than or equal to about $4 \times 10^{-6}/°$ C., and in certain variations, optionally less than or equal to about $2 \times 10^{-6}/°$ C. The first metal component defines the first surface and an opposite second surface. The first metal component has a second CLTE greater than or equal to about $20 \times 10^{-6}/°$ C., optionally greater than or equal to about $24 \times 10^{-6}/°$ C., and in certain variations, optionally greater than or equal to about $26 \times 10^{-6}/°$ C. The component assembly also comprises a second component disposed in proximity to the opposite second surface and having a third CLTE less than or equal to about $20 \times 10^{-6}/°$ C., optionally less than or equal to about $15 \times 10^{-6}/°$ C., optionally less than or equal to about $12 \times 10^{-6}/°$ C., optionally less than or equal to about $10 \times 10^{-6}/°$ C., optionally less than or equal to about $7 \times 10^{-6}/°$ C., optionally less than or equal to about $5 \times 10^{-6}/°$ C., and in certain variations, optionally less than or equal to about $4 \times 10^{-6}/°$ C. The polymeric composite structure coupled to the first surface reduces radial thermal expansion of the first metal component and minimizes separation of the second surface of the first metal component from the second component. As noted above, in certain preferred variations, the first metal component comprises aluminum, magnesium, or alloys thereof, the second component comprises steel or ceramic, and the polymeric composite structure comprises a thermoplastic resin and a plurality of reinforcing materials selected from the group consisting of: carbon fibers, glass fibers, and combinations thereof.

In other aspects, the present disclosure contemplates a preloaded bearing assembly for a vehicle having at least two components with substantially different linear coefficients of thermal expansion. A polymeric composite structure is coupled to a first surface of a housing. The polymeric composite structure has a first coefficient of linear thermal expansion (CLTE) and a modulus of greater than or equal to about 40 GPa. The housing has a second CLTE. A bearing component is disposed under static preload in proximity to a second surface of the housing opposite to the first surface, the bearing component having a third CLTE. The second CLTE is greater than or equal to about 25% more than the third CLTE, or may be any of the values previously specified above.

The polymeric composite structure may have a first coefficient of linear thermal expansion (CLTE) of less than or equal to about $10 \times 10^{-6}/°$ C. and a modulus of greater than or equal to about 40 GPa. In certain aspects, the first CLTE is optionally less than or equal to about $8 \times 10^{-6}/°$ C., optionally less than or equal to about $6 \times 10^{-6}/°$ C., optionally less than or equal to about $4 \times 10^{-6}/°$ C., and in certain variations, optionally less than or equal to about $2 \times 10^{-6}/°$ C. The first metal component defines the first surface and an opposite second surface. The first metal component has a second CLTE greater than or equal to about $20 \times 10^{-6}/°$ C., optionally greater than or equal to about $24 \times 10^{-6}/°$ C., and in certain variations, optionally greater than or equal to about $26 \times 10^{-6}/°$ C. The component assembly also comprises a second component disposed in proximity to the opposite second surface and having a third CLTE less than or equal to about $20 \times 10^{-6}/°$ C., optionally less than or equal to about $15 \times 10^{-6}/°$ C., optionally less than or equal to about $12 \times 10^{-6}/°$ C., optionally less than or equal to about $10 \times 10^{-6}/°$ C., optionally less than or equal to about $7 \times 10^{-6}/°$ C., optionally less than or equal to about $5 \times 10^{-6}/°$ C., and in certain variations, optionally less than or equal to about $4 \times 10^{-6}/°$ C. The polymeric composite structure coupled to the first surface reduces radial thermal expansion of the housing and minimizes separation of the second surface of the housing from the bearing component.

In certain aspects, the housing comprises aluminum, magnesium, or alloys thereof. The bearing component may comprise steel or ceramic. The polymeric composite structure comprises a thermoplastic resin and a plurality of reinforcing materials selected from the group consisting of: carbon fibers, glass fibers, and combinations thereof. In other variations, the bearing component is part of a tapered roller bearing assembly. In certain aspects, the bearing component is an angular contact ball bearing.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of minimizing thermal expansion in a component assembly for a vehicle having at least two components with substantially different linear coefficients of thermal expansion, the method comprising:
    coupling a polymeric composite structure having a first coefficient of linear thermal expansion (CLTE) and a modulus of greater than or equal to about 40 GPa to a first surface of a first metal component having a second CLTE, where the first metal component further defines a second surface opposite to the first surface disposed in proximity with a second component having a third CLTE, wherein the second CLTE is greater than or equal to about 25% more than the third CLTE, while the first CLTE is less than or equal to the third CLTE, so that the polymeric composite structure coupled to the first surface reduces radial thermal expansion of the first metal component and minimizes separation of the second surface of the first metal component from the second component, wherein the coupling comprises attaching the polymeric composite structure to the first metal component via one or more mechanical interlock features.

2. The method of claim 1, wherein the first CLTE is less than or equal to about $10 \times 10^{-6}/°$ C., the second CLTE is greater than or equal to about $20 \times 10^{-6}/°$ C., and the third CLTE is less than or equal to about $20 \times 10^{-6}/°$ C.

3. The method of claim 1, further comprising forming the one or more mechanical interlock features in the first surface of the first metal component by machining.

4. The method of claim 1, wherein the coupling comprises applying a pre-preg composite material to the first surface of the first metal component, followed by curing the pre-preg composite material to form the polymeric composite structure.

5. The method of claim 1, wherein the first surface of the first metal component is circumferential and the polymeric composite structure is a band or ring structure disposed around the first surface.

6. The method of claim 1, wherein the polymeric composite structure is disposed along discrete discontinuous regions of the first surface.

7. The method of claim 1, wherein the first metal component comprises a metal selected from the group consisting of: aluminum, magnesium, and alloys thereof, the second component comprises a material selected from the group consisting of: steel, and ceramic, and the polymeric composite structure comprises a thermoplastic resin and a plurality of reinforcing materials selected from the group consisting of: carbon fibers, glass fibers, and combinations thereof.

8. The method of claim 1, wherein the first metal component is a bearing assembly housing and the second component is a portion of a preloaded bearing component.

9. A method of minimizing thermal expansion in a preloaded bearing assembly for a vehicle having at least two components with substantially different linear coefficients of thermal expansion, the method comprising:
coupling a polymeric composite structure having a first coefficient of linear thermal expansion (CLTE) and a modulus of greater than or equal to about 40 GPa to a first surface of a housing formed of a lightweight metal having a second CLTE, where the housing further defines a second surface opposite to the first surface disposed in proximity with a bearing component having a third CLTE, wherein the second CLTE is greater than or equal to about 25% more than the third CLTE, while the first CLTE is less than or equal to the third CLTE, so that the polymeric composite structure coupled to the first surface reduces radial thermal expansion of the housing and minimizes separation of the second surface of the housing from the bearing component, wherein the coupling comprises attaching the polymeric composite structure to the first metal component via one or more mechanical interlock features.

10. The method of claim 9, wherein the first CLTE is less than or equal to about $10 \times 10^{-6}/^\circ$ C., the second CLTE is greater than or equal to about $20 \times 10^{-6}/^\circ$ C., and the third CLTE is less than or equal to about $20 \times 10^{-6}/^\circ$ C.

11. The method of claim 9, wherein the housing comprises a metal selected from the group consisting of: aluminum, magnesium, and alloys thereof, the bearing component comprises a material selected from the group consisting of: steel, and ceramic, and the polymeric composite structure comprises a thermoplastic resin and a plurality of reinforcing materials selected from the group consisting of: carbon fibers, glass fibers, and combinations thereof.

12. The method of claim 9, wherein the bearing component is part of a tapered roller bearing assembly.

13. The method of claim 9, wherein the bearing component is an angular contact ball bearing.

* * * * *